(12) United States Patent
Ohgo

(10) Patent No.: US 6,269,072 B1
(45) Date of Patent: Jul. 31, 2001

(54) OPTICAL DISC

(75) Inventor: Takashi Ohgo, Yokosuka (JP)

(73) Assignee: Victor Company of Japan, Ltd., Yokohama (JP)

(*) Notice: Subject to any disclaimer, the term of this patent is extended or adjusted under 35 U.S.C. 154(b) by 0 days.

(21) Appl. No.: 09/640,004

(22) Filed: Aug. 17, 2000

(30) Foreign Application Priority Data

Oct. 22, 1999 (JP) .................................................. 11-300727
Jan. 18, 2000 (JP) .................................................. 12-008706

(51) Int. Cl.$^7$ ....................................................... G11B 5/84
(52) U.S. Cl. ..................... 369/286; 369/288; 428/64.4; 428/65.2
(58) Field of Search ........................... 369/286, 275.1, 369/272, 275.2, 275.5, 280, 283, 288; 430/320, 321; 428/64.4, 65.2, 64.5, 64.6

(56) References Cited

U.S. PATENT DOCUMENTS

| | | | |
|---|---|---|---|
| 4,782,477 | * 11/1988 | Ichihara et al. | 369/275.5 |
| 5,364,735 | * 11/1994 | Akamatsu et al. | 430/270.12 |
| 5,665,520 | * 9/1997 | Yoshioka et al. | 430/270.13 |
| 5,972,461 | * 10/1999 | Sandstrom | 428/64.3 |
| 6,128,274 | * 10/2000 | Mori et al. | 369/275.5 |

FOREIGN PATENT DOCUMENTS

| | | | |
|---|---|---|---|
| 62-245540 | * 10/1987 | (JP) | 369/286 |
| 64-16683 | * 1/1989 | (JP) | 369/286 |
| 3-238636 | * 10/1991 | (JP) | 369/286 |
| 8-106663 | * 4/1996 | (JP) | 369/286 |
| 63-227390 | * 9/1998 | (JP) | 369/286 |
| 9-323794 | 5/1999 | (JP) | . |
| 11-242829 | * 9/1999 | (JP) | 369/286 |

* cited by examiner

*Primary Examiner*—Tan Dinh
(74) *Attorney, Agent, or Firm*—Connolly Bove Lodge & Hutz LLP

(57) ABSTRACT

An optical disc used for information recording capable of suppressing an increase of birefringence of the light-transmitting layer at the minimum, resulting in an optical disc having a high quality without a degradation of signal characteristics. The optical disc has a substrate having a group of pits/grooves representing information signal on a surface thereof, a reflecting layer formed on the substrate, and a resin film formed on the reflecting layer through an adhesive layer, wherein a thickness of the adhesive layer is made to be not more than 100 μm, and a product value of a photoelasticity constant, a modulus of tension elasticity and a thickness with respect to the resin film is established within −0.2 to 0.2 mm.

4 Claims, 13 Drawing Sheets

OPTICAL DISC

BACKGROUND OF THE INVENTION

1. Field of the Invention

The present invention is related to an optical disc used for a high-density recording, particularly, related to an optical disc from which recording signals are reproduced by irradiating a reproducing light on a recording surface thereof through a resin film and adhesive layer formed in the optical disc.

2. Description of the Related Art

Recently, in the field of information recording, the study for an optical information recording method has been forwarded in various places. This method has such various advantages as to record or reproduce information signals in a non-contact manner, to attain a high recording density more than 10 times compared with the magnetic recording method, and to provide various memories such as a read only memory, a rewritable (or writable) memory and a write once memory. Thus, this optical information recording method is considered to be one of methods capable of realizing a large-capacity file in low cost, and its wide application, from industrial use to consumer use, has been studied in various fields. Among all, a digital audio disc and an optical videodisc known as an optical disc corresponding to the read only memory have spread over the world.

In the above optical disc such as an audio digital optical disc, a reflecting layer of a metal such as aluminum is formed on a transparent substrate (or an optical disc substrate) on which a group of pits and grooves representing information signals are formed in a concavity or convexity pattern. Further, a protecting layer is formed on the reflecting layer for preventing erosion and flaws from developing on the reflecting layer.

Upon reproducing information signal from the optical disc, the reproducing light such as a leaser beam is irradiated on the concavity or convexity pattern from a side of the optical disc substrate, and the information signal is detected as a difference of reflectivity caused by the concavity or convexity pattern. In other words, it is detected as a difference of a light intensity between an incident light and its reflected light from the concavity or convexity pattern.

Upon manufacturing such an optical disc, the optical disc substrate is formed to have the concavity or convexity pattern by using such an injection molding method. Then, the reflecting layer of such a metal as mentioned above is formed thereon. Further, the protecting layer made of, for instance, an ultraviolet curing resin is formed thereon.

Recently, a further high-density recording has been demanded. In order to respond to this demand, there is proposed a countermeasure in which a numerical aperture (referred to as NA hereinafter) of an objective lens installed in an optical pickup for irradiating the reproducing light is made to be larger to reduce a radius of a spot of the reproducing light. For instance, the NA of the objective lens used for the digital audio disc was 0.45 so far.

On the other hand, in the optical video disc (for instance, Digital Versatile Disc, referred to as DVD, hereinafter), which has a large recording capacity of more than 6–8 times compared with that of the digital audio disc, the NA of the objective lens used for the optical video disc is made to be about 0.60.

As the NA of the objective lens is made to be larger, it is necessary to reduce a thickness of the optical disc substrate through which an incident reproducing light passes. This reason is that the thicker, a thickness of the optical disc substrate becomes, the fewer, an allowance for a tilt angle to an optical axis of the optical pickup becomes, and when the tilt angle becomes larger, the reflected light is badly affected by aberrations and birefringence caused by the thickness of the optical disc substrate. Here, the tilt angle to the optical axis of the optical pickup is defined as an angle of an optical axis thereof deviated from a normal line to a surface of the optical disc. Thus, the thickness of the substrate is made to be as thin as possible to prevent the bad effect of aberrations and birefringence. For instance, in the digital audio disc mentioned in the foregoing, the thickness of the substrate is made to be 1.2 mm. On the other hand, in the optical videodisc such as the DVD, which has a recording capacity 6–8 times as large as the digital audio disc, the thickness of the substrate is made to be about 0.6 mm.

However, it seems that the thickness of the substrate needs to be made much thinner to satisfy a demand for a further high-recording density.

As a countermeasure thereof, there is proposed an optical recording medium having a light transmission layer having a thin thickness on the reflecting layer. Specifically, an information recording layer with cavities, so called pits, is formed on a main surface of the optical disc substrate, and there are formed a reflecting layer thereon. Further, the light transmission layer for allowing a light to pass through is formed on the reflecting layer. Upon reproducing, the reproducing light is irradiated from the side of the light transmission layer. Thereby, it is possible to provide the benefits of a large NA of the objective lens by thinning the thickness of the light transmission layer.

When the light transmission layer is made to be thin, however, it is difficult to successfully manufacture such a thin light transmission layer having a thickness of 0.1 mm with a thermoplastic resin by using an injection molding machine without degrading the birefringence and transparency thereof in the prior art.

As a countermeasure thereof, there is proposed a method for manufacturing the light transmission layer with an ultraviolet curing resin in the Japanese Patent Laid-open Publication No. 8-235638/96. However, there is a problem that it is difficult to manufacture the light transmission layer having a uniform thickness, resulting in a difficulty to reproduce the information signals stably.

As a countermeasure thereof, there is proposed another method for providing the light transmission layer on the reflecting layer in the Japanese Patent Laid-open Publication No. 10-283683/98, wherein a resin film having a thickness of 0.1 mm is bonded on the reflecting layer as the light transmission layer with an adhesive by a roll-pressure method or with an ultraviolet ray curing adhesive by a spin coating method.

Incidentally, as one of the important characters for the optical disc, there is a birefringence phenomenon on the light transmission layer for allowing the light to pass through. The birefringence implies a phenomenon that an incident light impinging on an anisotropy material is separated into two lights vibrating in a perpendicular direction to each other. These two lights propagate in a different velocity, respectively, resulting in an optical path difference (a phase difference) when they have passed through the anisotropy material. This optical path difference has to be made as small as possible because it badly affects the reproducing signal characteristics. As conventional countermeasures thereof, the injection molding technique and the materials for the disc substrate have been improved ever since. These improvements have been made in a composite type optical disc as well.

On one hand, in the case of the optical disc where the light transmission layer is formed by bonding the thin film made of resin on the reflecting layer with the adhesive, there is a problem that the birefringence of the thin film is increased in a process of bonding or upon reproducing information signals at a high speed rotation of the optical disc due to a centrifugal force.

Specifically, in the case of providing the thin film on the reflecting layer by using the roll pressure method, a stress-strain is partially developed in the thin film because of deviations of pressure given from the roller and of thickness of the thin film. Thereby, the birefringence is increased to badly affect the reproducing signal characteristics of the optical disc, especially to such an extent that it badly effects a deviation of the reproducing signal output occurring during one rotation of the optical disc.

On the other hand, in the case of the optical disc where the thin film is formed with the ultraviolet ray curing adhesive by using the spin coating method, there is a problem that a curing strain is developed in the adhesive layer when the curing speed is promoted by increasing an intensity of ultraviolet ray, or the adhesive layer is cured in such a state that the adhesive layer involves dusts and foams in the bonding process.

Further, upon reproducing the information signal from the optical disc, the optical disc is rotated at a high speed. Thus, a strain is developed in the adhesive layer because of the centrifugal force thereof.

As mentioned above, when the strain is developed in the adhesive layer, the thin film is also strained because they are directly joined, resulting in an increase of the birefringence in the thin film. Further, upon using the optical disc having such a strain in the adhesive layer and the thin film under a humid and hot circumstance (for instance, in a car in a midsummer), the thin film is softened because it is made of a resin. Thus, the strain therein increases, resulting in an increase of the birefringence thereof. This poses a problem that the reliability of the optical disc is degraded.

SUMMARY OF THE INVENTION

Accordingly, it is a general object of the present invention to provide an optical disc in which the above-mentioned problems are eliminated.

More specific object of the present invention is to provide an optical disc having a high quality without degradation of the reproducing signal characteristics by suppressing an increase of development of the birefringence at minimum even when the curing speed of the adhesive is increased or the dust and foam are involved into the adhesive in the production process or the optical disc is rotated at a high speed.

Further more specific object of the present invention is to provide an optical disc used for an optical information recording comprising: a substrate having a group of pits/grooves representing information signal on a surface thereof; a reflecting layer formed on the substrate; and a resin film formed on the reflecting layer through an adhesive layer, wherein a thickness of the adhesive layer being not more than 100 μm and a product value of a photoelasticity constant, a modulus of tension elasticity and a thickness with respect to the resin film being established within −0.2 to 0.2 mm.

Another and more specific object of the present invention is to provide an optical disc used for an optical information recording comprising: a substrate having a group of pits/grooves representing information signal on a surface thereof; a reflecting layer formed on the substrate; a recording layer formed on the reflecting layer; and a resin film formed on the reflecting layer through an adhesive layer, wherein a thickness of the adhesive layer being not more than 100 μm, and a product value of a photoelasticity constant, a modulus of tension elasticity and a thickness with respect to the resin film being established within −0.2 to 0.2 mm.

Another and more specific object of the present invention is to provide an optical disc comprising: a substrate having a group of pits/grooves representing information signal on a surface thereof; a reflecting layer formed on the substrate, a first dielectric layer formed on the reflecting layer; a recording layer formed on the reflecting layer; a second dielectric layer formed on the recording layer; and a resin film formed on the reflecting layer through an adhesive layer, wherein a thickness of the adhesive layer being not more than 100 μm and a product value of a photoelasticity constant, a modulus of tension elasticity and a thickness with respect to the resin film being established within −0.2 to 0.2 mm.

BRIEF DESCRIPTION OF THE DRAWINGS

FIG. 11($b$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 150 μm in the comparative example 4-2 of the present invention;

FIG. 11($c$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 200 μm in the comparative example 4-3 of the present invention;

FIG. 13($b$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 150 μm in a comparative example 5-2 of the present invention;

FIG. 13($c$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 200 μm in a comparative example 5-3 of the present invention;

FIG. 15($b$) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 150 μm in a comparative example 6-2 of the present invention;

FIG. 15($c$) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 200 μm in a comparative example 6-3 of the present invention;

FIG. 17(b) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 150 μm in a comparative example 7-2 of the present invention, and FIG. 17(c) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 200 μm in a comparative example 7-3 of the present invention.

DETAILED DESCRIPTION OF THE PREFERRED EMBODIMENTS

Figure 1A:
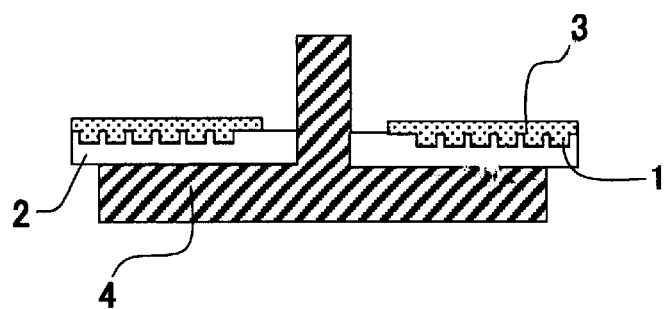
FIGS. 1(a) to 1(e) are explanatory views showing manufacturing processes of an optical disc in an embodiment of the present invention.

Next, a detailed description is given of advantages of the optical discs according to the present invention.

As a result of intensively studying the problems mentioned above, the present inventor has discovered a fact that a photoelasticity constant, a modulus of tension elasticity and a thickness of the resin film used for the optical transmission layer are key points to solve the above problems.

Generally, even a homogeneous and uniform transparent material presents an optical anisotropy when an internal stress is developed in the material, and the birefringence is temporally developed in the material in proportion to the internal stress. This phenomenon is known as a photoelasticity phenomenon. The photoelasticity constant mentioned in the foregoing is a proportional constant between an internal stress and a birefringence as shown in a formula (1).

$$\Delta n = C \cdot \sigma \quad (1)$$

Wherein, $\Delta n$: a birefringence, C: a photoelasticity constant and $\sigma$: an internal stress.

Upon reproducing the information signal from the optical disc, it is an optical path deference that causes a problem, and the optical path deference is shown in a formula (2).

$$R = \Delta n \cdot d = C \cdot \sigma d \quad (2)$$

Wherein, R: an optical path deference, $\Delta n$: a birefringence, d: a length of an optical path, C: the photoelasticity constant and $\sigma$: the internal stress.

Generally, the photoelasticity phenomenon results from a molecular alignment in a certain direction in a material, and the molecular alignment results from a stress developed or given in or to the material. Thus, it is known that the source of the birefringence developed in the optical disc also results from the molecular alignment. Accordingly, in the prior art, the development of the birefringence in the optical disc is suppressed by using a material having a small photoelasticity constant or by controlling the alignment of the molecules taking account of various molding conditions.

However, the photoelasticity constant has a temperature dependency. As the temperature rises, the hardness of the material is decreased, resulting in an increase of a value of the photoelasticity constant. This reason is that when the hardness of the material is decreased, a value of the strain is more increased to a certain stress, resulting in that the molecular alignment in a certain direction increases. The optical disc may be used under such a severe circumstance as a humid and hot condition. Thus, it is impossible to satisfy all the service conditions by simply taking account for the photoelasticity constant of the material.

Accordingly, the present inventor gave attention to a modulus of tension elasticity of the plastic film along with the photoelasticity constant thereof. The modulus of tension elasticity represents a mechanical strength of a material, and has an adverse temperature dependency characteristic compared with the photoelasticity constant. Specifically, as the temperature rises, the modulus of tension elasticity is decreased.

A value of a product obtained by multiplying the photoelasticity constant and the modulus of tension elasticity make a value of a new property without the temperature dependency because the temperature dependencies of them are offset to each other. Thus, it is possible to suppress the increase of birefringence even under the humid and hot circumstance by holding the value of the product within a certain range. In practice, it is the optical path difference between separated two lights that affects the reproducing signal characteristics. As seen from the equation (2), the optical path difference R is proportional to the optical path d, i.e., the thickness of the film. Thus, the present inventor discovered a fact that it is possible to obtain a high quality and reliable optical disc by suppressing a value of the product obtained by multiplying the value of the property, i.e., the product of the photoelasticity constant and the modulus of tension elasticity, and the thickness of the resin film within a certain range.

Further, the present inventor has also discovered a fact that a thickness of adhesive used for bonding the thin resin film is deeply related to the above problem. As a strain developed in the resin film results from the strain developed in the adhesive, it will be understood that in the case of the adhesive having a thin thickness, the stain in the adhesive hardly affects the resin film. On the contrary, in the case of the adhesive having a thick thickness, the stain developed in the adhesive affects the resin film very much. In this case, the birefringence of the adhesive layer itself will badly affect the reproducing signal characteristics more than that of the resin film, so that the value of the property mentioned above cannot be applied to this problem.

As a result of hard studying, the present inventor has discovered that the present invention is applicable to a case where the thickness of the adhesive is not more than 100 μm.

The optical disc according to the present invention can be applied to not only the read only type but also various kinds of optical discs such as a write once type and a writable type one.

In a manufacture process of the read only type disc, a disc substrate having cavities representing information signal, so called pits, formed on a surface thereof are used. On the surface having a group of pits of the disc substrate, a reflecting layer made of a metal is formed by using a spattering method. On the reflecting layer a resin film is bonded with an adhesive, resulting in the read only type optical disc.

In the manufacture process of a write once type disc, a disc substrate having guiding grooves formed on a surface thereof (and pits representing information for read only, if necessary) is used. On the side of grooves of the disc substrate, a reflecting layer made of a metal is formed by using a spattering method. Further, on the reflecting layer a recording layer made of an organic dye is formed by using a spin coating method, and a resin film is bonded on the recording layer with an adhesive.

In the manufacture process of a writable type disc, a disc substrate having guiding grooves on a surface thereof (and emboss pits for address information, if necessary) is used. On the surface having grooves of the disc substrate, a reflecting layer, a second dielectric layer, a recording layer and a first dielectric layer are successively formed in this order by using a spattering method. Further, on the first dielectric layer a resin film is bonded with an adhesive.

In the various kinds of optical discs mentioned above, a reflecting layer made of a metal is used. As the material of the metal, a metal or a metal alloy or a metal compound selected among such metals as Au, Al, Ag, Pt, Pd, Ni and Cu, is used.

In the write once type optical disc, the organic dye is used as the recording layer. As the material of the organic dye, a material capable of absorbing a laser beam used for recording information signals, for instance, cyanine dye, merocyanine dye, azomethine dye, azo dye, phthalocyanine dye or a metal complex having a color structure of these dyes as a ligand is used.

As the materials of the first and second dielectric layers in the writable type optical disc, there is used a metallic oxide, a nitride and a sulfide, for instance, $ZnS—SiO_2$, $ZnS$, $SiO_2$, $Ta_2O_5$, $Si_3N_4$, $AlN$, $Al_2O_3$, $AlSiON$, $ZrO_2$ and $TiO_2$, or a combined material selected from these materials. As the material of the reflecting layer, a phase change material capable of utilizing a change of reflectivity or a change of refractive index between a state of amorphous and a state of crystal, for instance, Ge—Sb—T system alloy and In—Ts—Sb system alloy are used.

As the resin film, any kinds of resins are used as long as it allows the light having a wavelength used in reproducing light to pass through. For instance, polycarbonate, poly (methyl methacrylate), polyethylene terephthalate, polystyrene, poly-α-methylstyrene, and triacetylcellulose, are used.

A magnitude of the photoelasticity constant is largely depending on the molecular structure of the material used, however, it is preferable to have a homogeneous structure in molecular. With respect to the photoelasticity constant of the material, there are two kinds of values, a plus value (for instance, polycarbonate and polyethylene terephthalate) and a minus value (poly methyl methacrylate and poly-α-methylstylene). Thus, blending these materials can also control the magnitude of the photoelasticity constant of the resin film. The magnitude of the modulus of tension elasticity of the material is affected by the molecular structure thereof, however, it is possible to increase the magnitude of the modulus of tension elasticity by a ductility treatment after molding.

Next, the description is given of preferred embodiments of the optical discs in the present invention, referring to attached figures.

[Embodiment 1]

FIGS. 1(a) to 1(e) are explanatory views showing manufacturing processes of an optical disc in an embodiment of the present invention.

As shown in FIGS. 1(a) to 1(e), first, a polycarbonate substrate 2 having a diameter of 120 mm and a thickness of 0.9 mm and formed with a group of pits 1 representing information signals based on, for instance, the EFM (Eight to Fourteen Modulation) signal is made by using an injection molding method. The group of pits 1 based on the EFM signal has the shortest pit length of 0.4 μm and a track pitch of 0.7 μm. Incidentally, the group of pits 1 provided on a master for producing replicas are formed by using the Kr laser beam having a wavelength of 413 nm. Then, a reflecting layer 3 made of aluminum having a thickness of about 600 Å is formed on the group of pits 1 by using a spattering method.

Figure 1B:
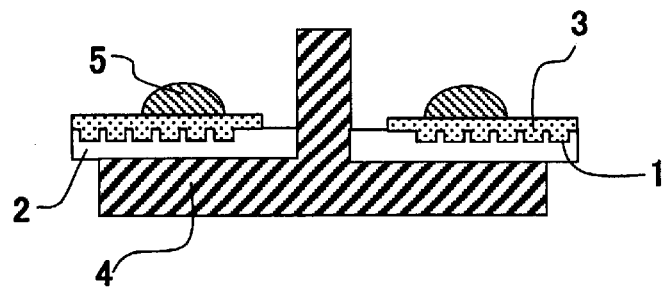

Next, as shown in FIG. 1(b), the polycarbonate substrate 2 formed with reflecting layer 3 is placed on a turntable 4 of a spin-coater with the reflecting layer 3 facing up. Then, an ultraviolet-ray curing adhesive (referred to as adhesive) 5 is coated on the reflecting layer 3 while the turn table 4 is being rotated at a low speed as shown in FIG. 1(b).

Figure 1C:
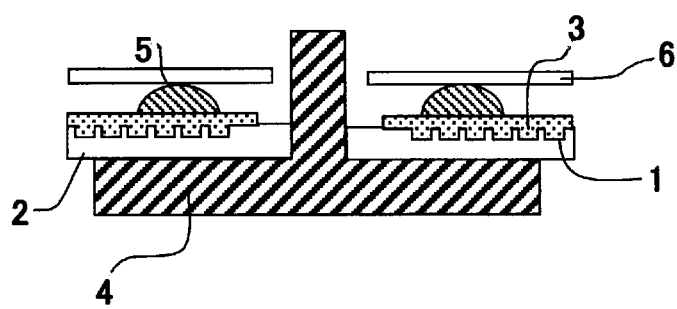
Figure 1D:
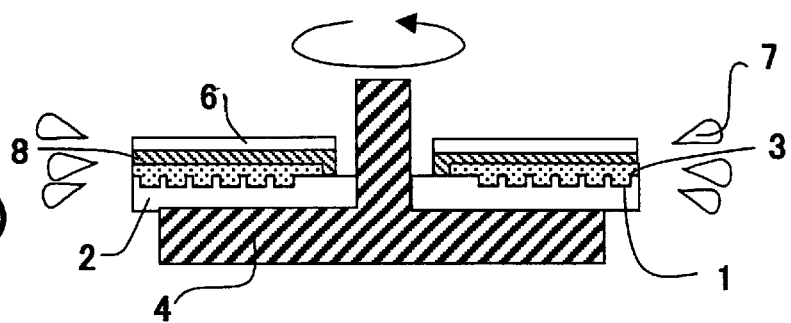

Next, a resin film 6 for transmitting a light is placed on the adhesive 5 as shown in FIG. 1(c). The resin film 6 has a doughnut shape with an outer diameter of 119 mm, which is slightly smaller than that of the polycarbonate substrate 2, an inner diameter of 30 mm and a thickness of 300 μm. After that, excessive adhesive 7 is removed by rotating the turntable 4 at a high speed, resulting in an adhesive layer 8 between the reflecting layer 3 and the resin film 6 as shown in FIG. 1(d).

Figure 1E:
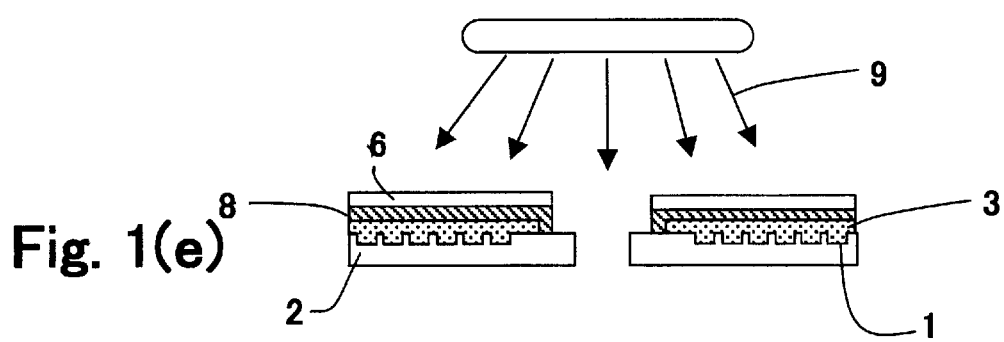

Next, the ultraviolet ray 10 is irradiated from the side of the resin film 6 to cure the adhesive layer 8, resulting in an optical disc 10 as shown in FIG. 1(e). Incidentally, the thickness of the adhesive layer 8 is made to be about 5 μm by controlling the rotating speed of the turntable 4.

The various kinds of optical discs 10 were produced by using different kinds of the resin film 6 obtained by changing values of the photoelasticity constant, the modulus of tension elasticity and the thickness of the resin film 6. The reproducing signal characteristics of these optical discs 10 were measured by irradiating a reproducing light having a wavelength of 670 nm on the optical discs from the side of the resin film 6 with a laser pickup having the NA of 0.7. The measurement of the reproducing signal characteristics of these optical discs 10 was performed about the variation of reproducing signal amplitude, i.e., a ratio of the maximum value to the minimum value in amplitudes of the reproducing signal during one rotation of each disc 10. The measurement of the modulus of tension elasticity of the resin film 6 was performed based on the test method ASTM-D638. The photoelasticity constant of the resin film 6 was calculated from a measurement result of the birefringence of the resin film 6 having a thickness of 100 μm. The birefringence values were measured with an ellipsometer using a light having a wavelength of 633 nm by changing a load applied to the resin film 6.

Figure 2:
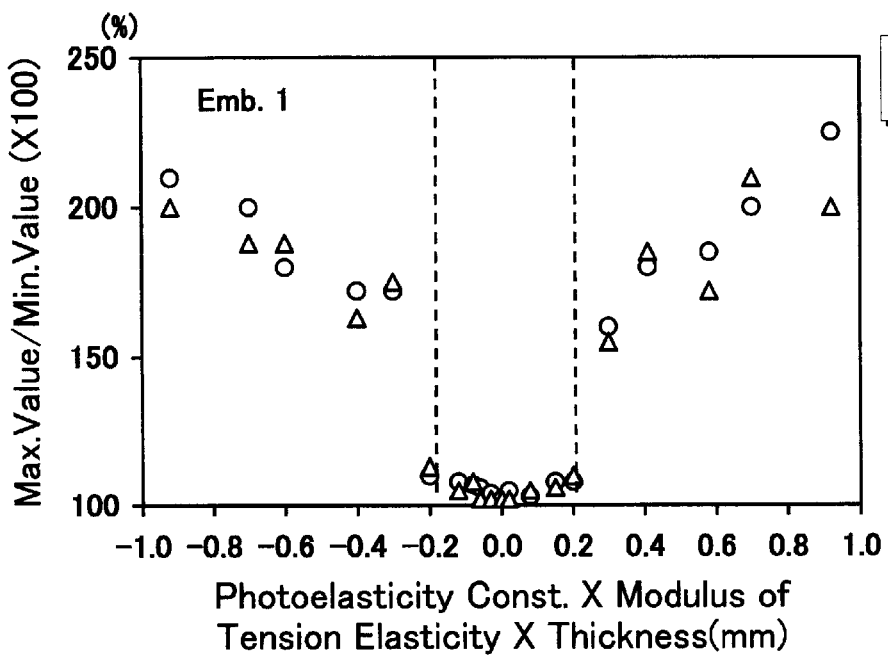
FIG. 2 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having the thickness of 5 μm in an embodiment 1 of the present invention.

FIG. 2 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having the thickness of 5 μm in an embodiment 1 of the present invention, wherein an axis of abscissa designates the product value and an axis of ordinate designates the ratio of the maximum value to the minimum value mentioned above, and a symbol ○ designates a data obtained under the measurement temperature of 23° C. and a symbol Δ designates a data obtained in the measurement temperature of 80° C.

As seen from FIG. 2, it is possible to obtain excellent reproducing signal characteristics under both the measurement temperature of 23° C. as room temperature and the measurement temperature of 80° C. that is a severer temperature condition than the measurement temperature of 23° C., as long as the product value of the photoelasticity constant, the modulus of tension elasticity and the thickness (mm) with respect to the resin film is established within −0.2 to 0.2 mm. In other words, it is possible to obtain the optical disc without a degradation of the reproducing signal characteristics by establishing the product values within −0.2 to 0.2 mm even when the optical disc is operated under such a wide measurement temperature range, resulting in that the optical disc having a high quality and a high reliability is obtained.

[Embodiments 2 to 5]

In embodiments 2 to 5 of the present invention, the thickness of he adhesive layer 8 of the optical disc 10 shown in FIG. 1 is made to be 20 $\mu$m, 40 $\mu$m and 100 $\mu$m, respectively. Other manufacturing conditions are made to be the same as those of the embodiment 1. Further, the measuring conditions are made to be the same as those of the embodiment 1. Thus, the detailed description is omitted here for simplicity.

Figure 3:
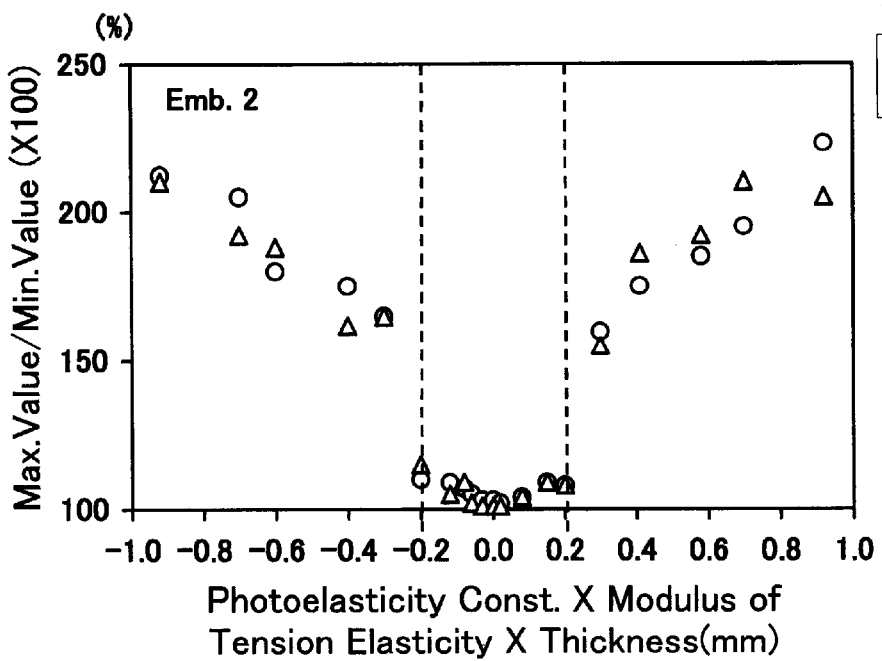
FIG. 3 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 20 μm in an embodiment 2 of the present invention.

FIG. 3 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 20 $\mu$m in an embodiment 2 of the present invention.

Figure 4:
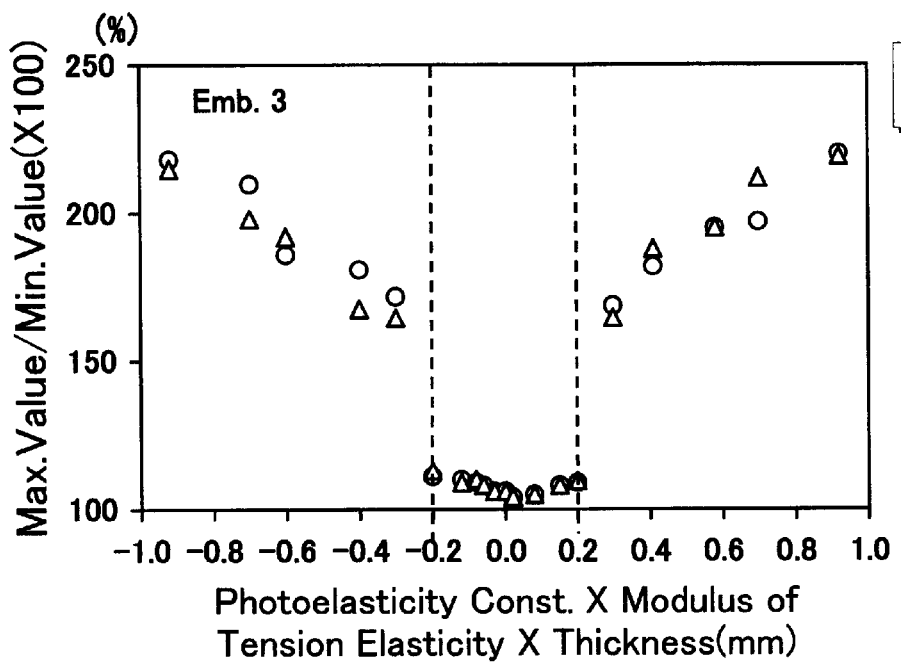
FIG. 4 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 40 μm in an embodiment 3 of the present invention.

FIG. 4 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 40 $\mu$m in an embodiment 3 of the present invention.

Figure 5:
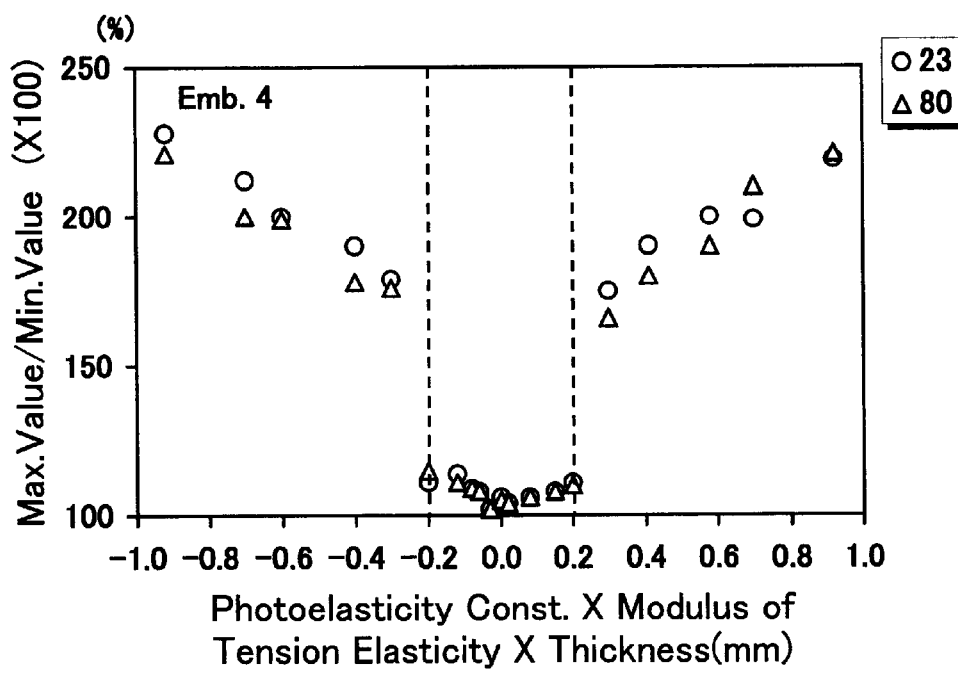
FIG. 5 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 70 μm in an embodiment 4 of the present invention.

FIG. 5 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 70 $\mu$m in an embodiment 4 of the present invention.

Figure 6:
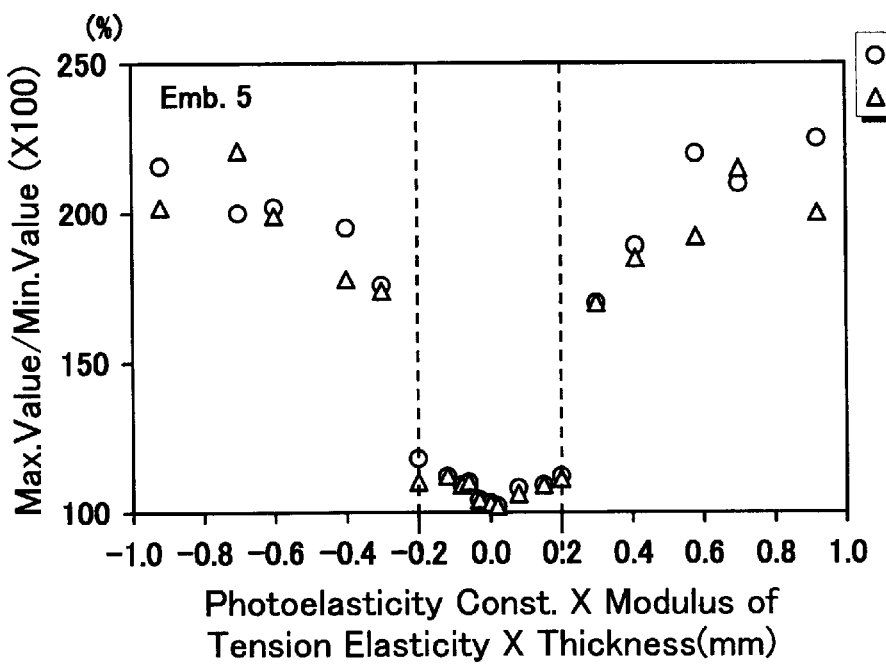
FIG. 6 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 100 μm in an embodiment 4 of the present invention.

FIG. 6 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 100 $\mu$m in an embodiment 5 of the present invention.

As seen from FIGS. 3 to 6, an excellent reproducing signal characteristic is obtained in the respective optical discs of the embodiments 3 to 5 by establishing the product value of the photoelasticity constant, the modulus of tension elasticity and the thickness of the adhesive layer within −0.2 to 0.2 mm.

Comparative Examples 1 to 3

In comparative examples 1 to 3, the thickness of the adhesive layer 8 is made to be 120 $\mu$m, 150 $\mu$m and 200 $\mu$m, respectively. Other manufacturing conditions and the measuring conditions are the same as those of the embodiment 1. Thus, the detailed description is omitted here for simplicity.

Figure 7:
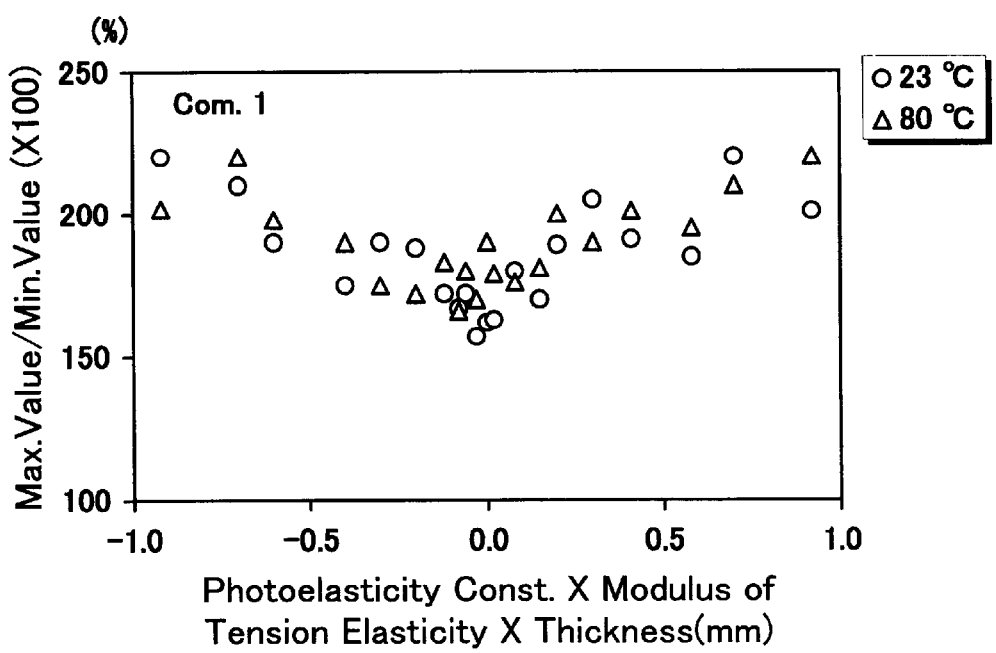
FIG. 7 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 120 μm in a comparative example 1 of the present invention.

FIG. 7 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 120 $\mu$m in a comparative example 1 of the present invention.

Figure 8:
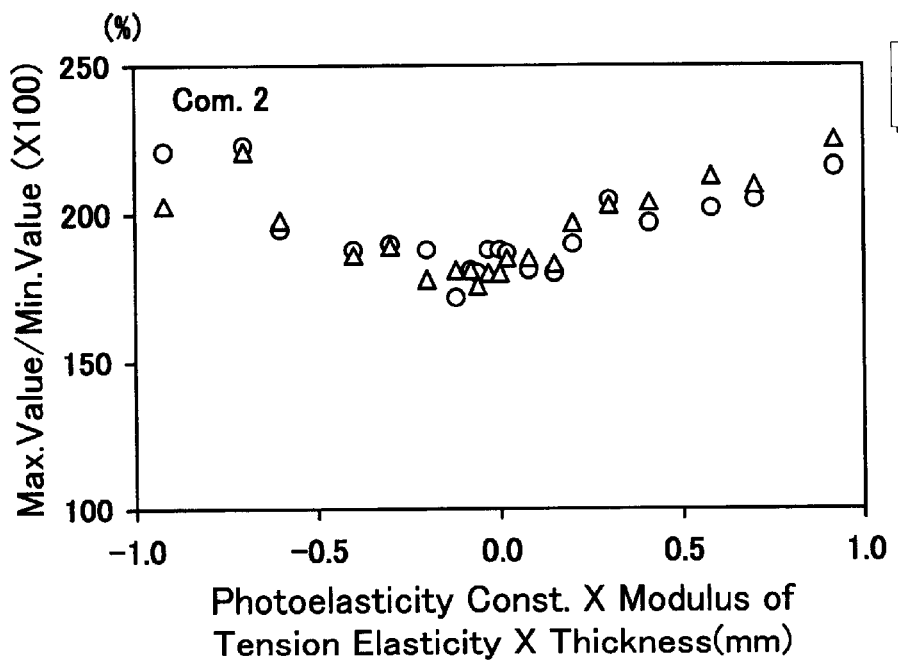
FIG. 8 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 150 μm in a comparative example 2 of the present invention.

FIG. 8 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 150 $\mu$m in a comparative example 2 of the present invention.

Figure 9:
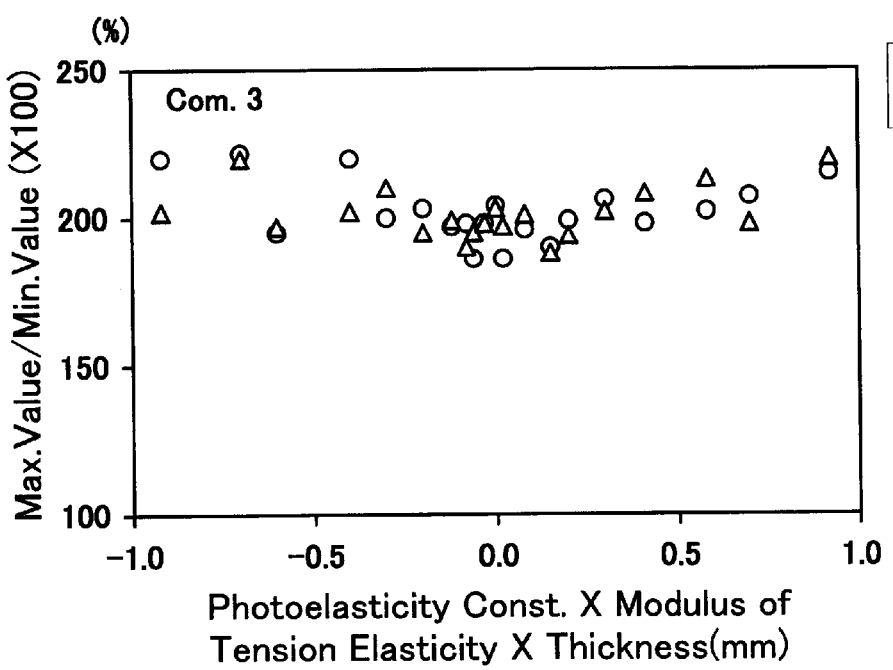
FIG. 9 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 200 μm in a comparative example 3 of the present invention.

FIG. 9 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with an adhesive layer having a thickness of 200 $\mu$m in a comparative example 3 in the present invention.

As seen from FIGS. 2 to 6 in the embodiments 1 to 5 and FIGS. 7 to 9 in the comparative examples 1 to 3, the respective ratio of the maximum value to the minimum value with respect to the reproducing signal amplitude in the comparative examples 1 to 3 is degraded compared with those of the embodiments 1 to 5 irrespective of the product value of a photoelasticity constant, a modulus of tension elasticity and a thickness (mm) with respect to the resin film 6. In other words, it will be understood that the thickness of the adhesive layer 8 has to be made to be not more than 100 $\mu$m.

[Embodiment 6]

Referring to FIGS. 1(*a*) to 1(*e*), an optical disc 10 of an embodiment 6 was formed in the same manner as mentioned in the embodiment 1 by using a polycarbonate substrate 2 having a diameter of 120 mm and a thickness of 1.1 mm and a resin film 6 having an outer diameter of 119 mm, an inner diameter of 30 mm and a thickness of 100 $\mu$m. The polycarbonate substrate 2 is formed with a group of pits 1 based on the EFM signals. The group of pits 1 have the shortest pit length of 0.254 $\mu$m and a track pitch of 0.6 $\mu$m. Incidentally, the group of pit 1 provided on a master for producing replicas is formed by using the Kr laser beam having a wavelength of 351 nm.

The various kinds of optical discs 10 were produced by using different kinds of the resin film 6 obtained by changing values of the photoelasticity constant, the modulus of tension elasticity and the thickness of the resin film 6. The reproducing characteristics of these optical discs 10 were measured with a laser pickup having the NA of 0.8 by irradiating a reproducing light having a wavelength of 413 nm from the side of the resin film 6. The measurement of the reproducing characteristic of these optical discs 10 was performed about the variation of the reproducing signal amplitude in one rotation of each disc 10.

Figure 10:
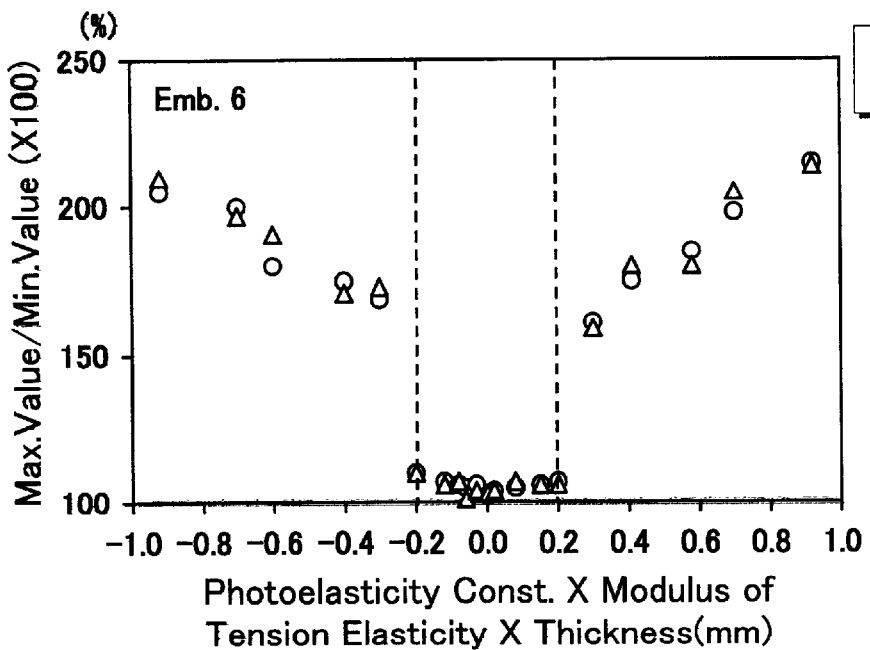
FIG. 10 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 5 μm in an embodiment 6 of the present invention.

FIG. 10 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 5 $\mu$m in an embodiment 6 of the present invention.

As seen from FIG. 10, an excellent signal characteristic is obtained in the respective optical discs of the embodiments 16 by establishing the product value of the photoelasticity constant, the modulus of tension elasticity and the thickness of the adhesive layer within −0.2 to 0.2 mm.

Comparative Examples 4-1, 4-2 and 4-3

In comparative examples 4-1 to 4-3, the thickness of the adhesive layer 8 is made to be 120 $\mu$m, 150 $\mu$m and 200 $\mu$m, respectively. Other manufacturing conditions and the measuring conditions are the same as those of the embodiment 6. Thus, the detailed description is omitted here for simplicity.

Figure 11A:
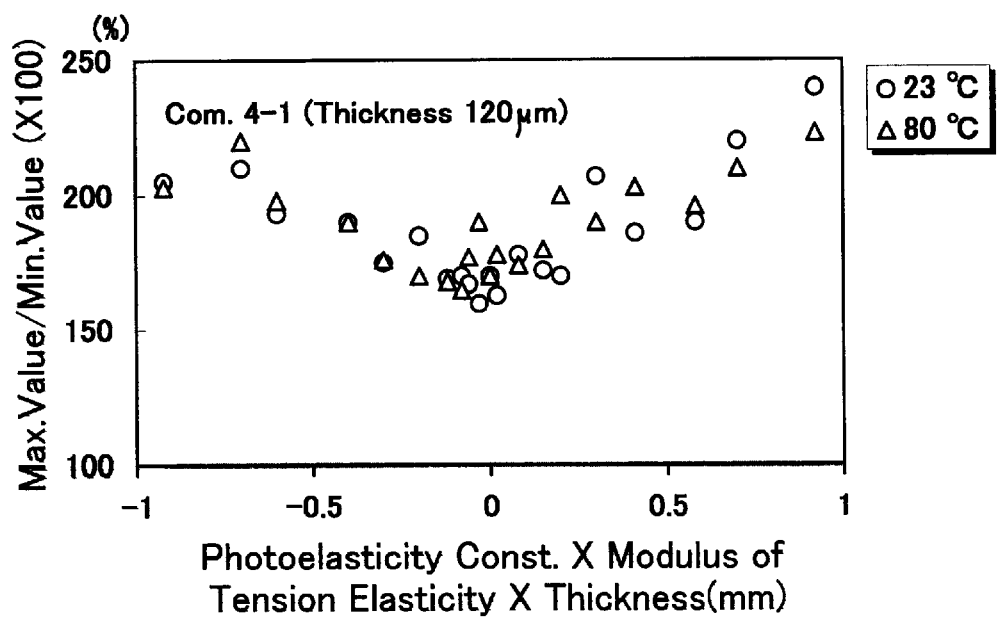
FIG. 11($a$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 120 μm in the comparative example 4-1 of the present invention.

FIG. 11(a) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 120 $\mu$m in the comparative example 4-1 in the present invention.

Figure 11B:
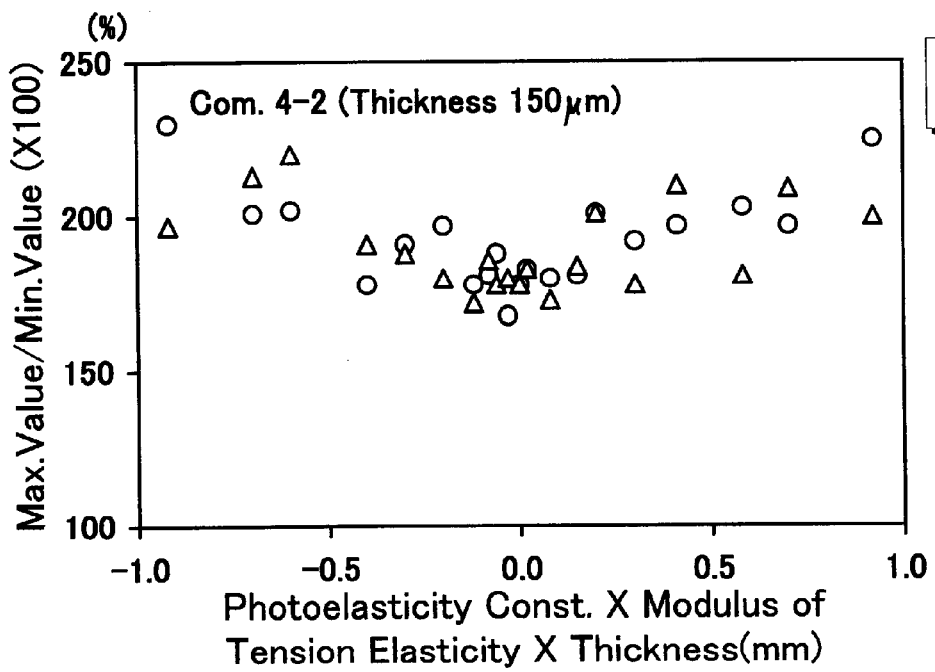

FIG. 11(b) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 150 $\mu$m in the comparative example 4-2 in the present invention.

Figure 11C:
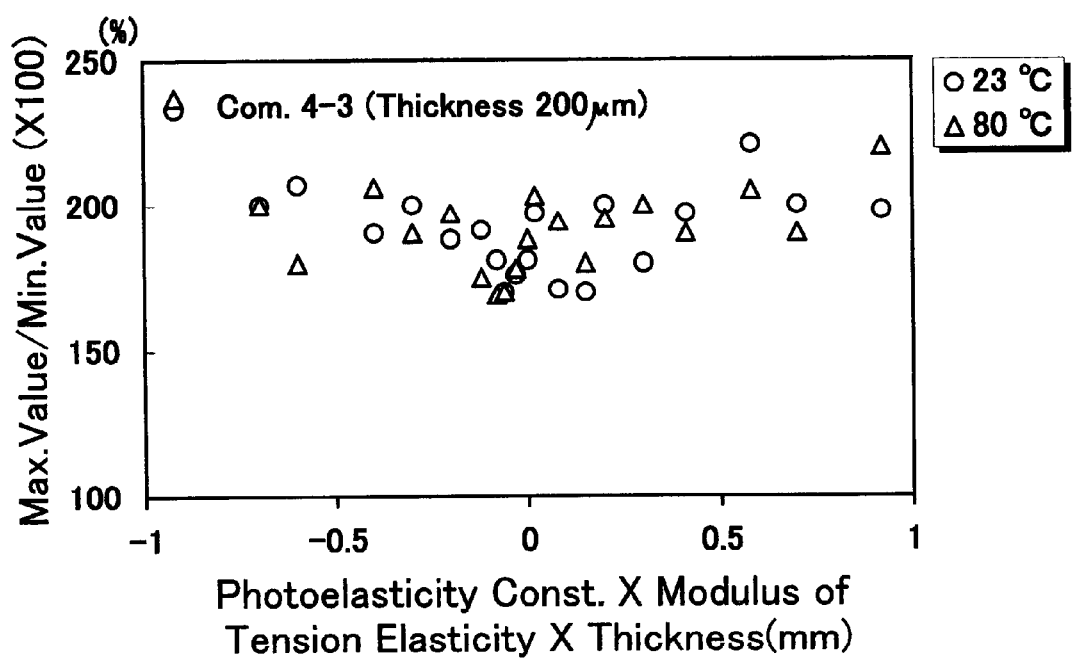

FIG. 11(c) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having a thickness of 200 $\mu$m in the comparative example 4-3 in the present invention.

As seen from FIGS. 11(a) to 11(c) in the comparative examples 4-1 to 4-3, the respective ratio of the maximum value to the minimum value with respect to the reproducing signal amplitude is degraded compared with those of the embodiment 6 irrespective of the product value of a photoelasticity constant, a modulus of tension elasticity and a thickness (mm) with respect to the resin film 6. In other words, the thickness of the adhesive layer 8 has to be made to be not more than 100 $\mu$m.

[Embodiment 7]

As shown in FIGS. 1(a) to 1(e), an optical disc 10 of an embodiment 7 was formed in the same manner as mentioned in the embodiment 1 by using a polycarbonate substrate 2 having a diameter of 120 mm and a thickness of 1.1 mm and a resin film 6 having an outer diameter of 119 mm, an inner diameter of 30 mm and a thickness of 100 $\mu$m. The polycarbonate substrate 2 is formed with a group of pits 1 based on the EFM signals. The group of pits 1 has the shortest pit length of 0.19 $\mu$m and a track pitch of 0.36 $\mu$m. Incidentally, the group of pits 1 provided on a master for producing replicas is formed by using the YAG fourth harmonic radiation having a wavelength of 266 nm.

The various kinds of optical discs 10 were produced by using different kinds of the resin film 6 obtained by changing values of the photoelasticity constant, the modulus of tension elasticity and the thickness of the resin film 6. The reproducing characteristics of these optical discs 10 were measured with a laser pickup having the NA of 0.8 by irradiating a reproducing light having a wavelength of 413 nm from the side of the resin film 6. The measurement of the reproducing signal characteristics of these optical discs 10 was performed about a variation of the reproducing signal amplitude in one rotation of each disc 10.

Figure 12:
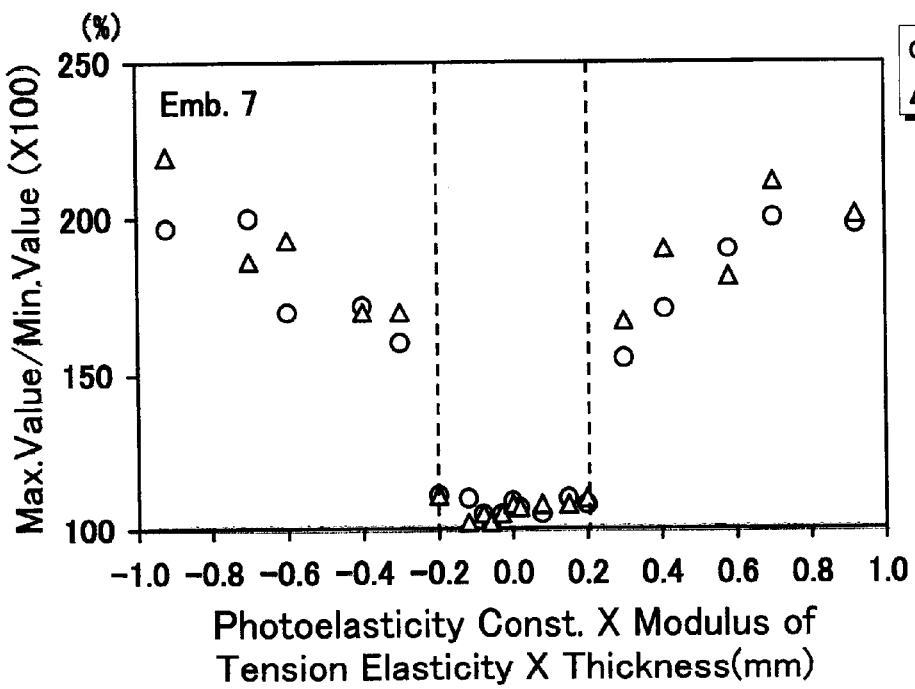
FIG. 12 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc having the adhesive layer of 5 μm in an embodiment 7 of the present invention.

FIG. 12 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc having the adhesive layer of 5 $\mu$m in an embodiment 7 of the present invention.

As seen from FIG. 12, an excellent signal characteristic is obtained in the respective optical discs of the embodiment 110 by establishing the product value of the photoelasticity constant, the modulus of tension elasticity and the thickness of the adhesive layer 8 within –0.2 to 0.2 mm.

Comparative Examples 5-1, 5-2 and 5-3

In comparative examples 5-1 to 5-3, the thickness of the adhesive layer 8 is made to be 120 $\mu$m, 150 $\mu$m and 200 $\mu$m, respectively. Other manufacturing conditions and the measuring conditions are the same as those of the embodiment 7. Thus, the detailed description is omitted here for simplicity.

Figure 13A:
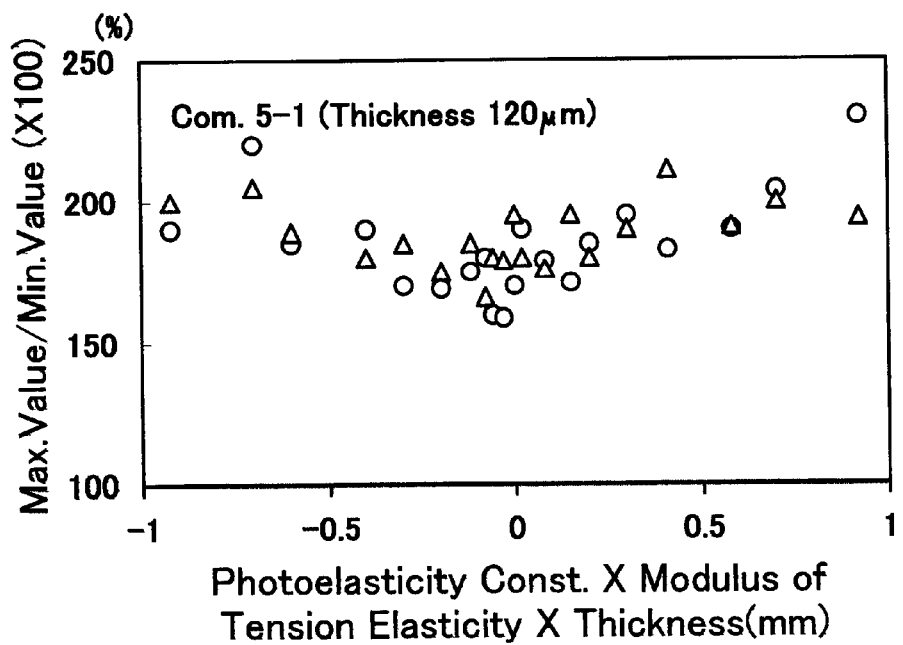
FIG. 13($a$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 120 μm in a comparative example 5-1 of the present invention.
Figure 13:
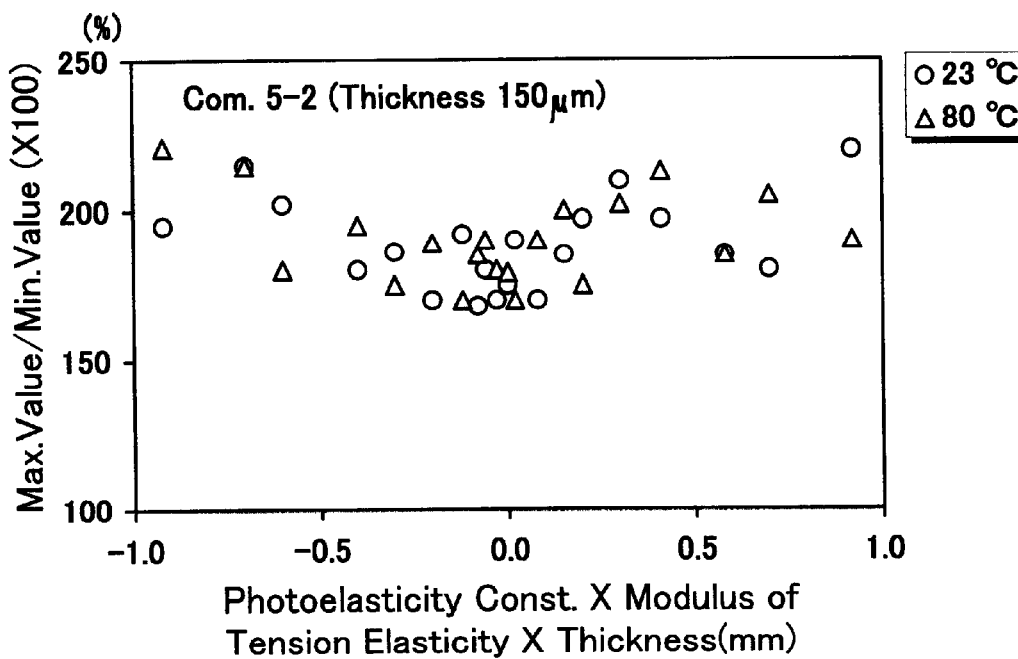
Figure 13:
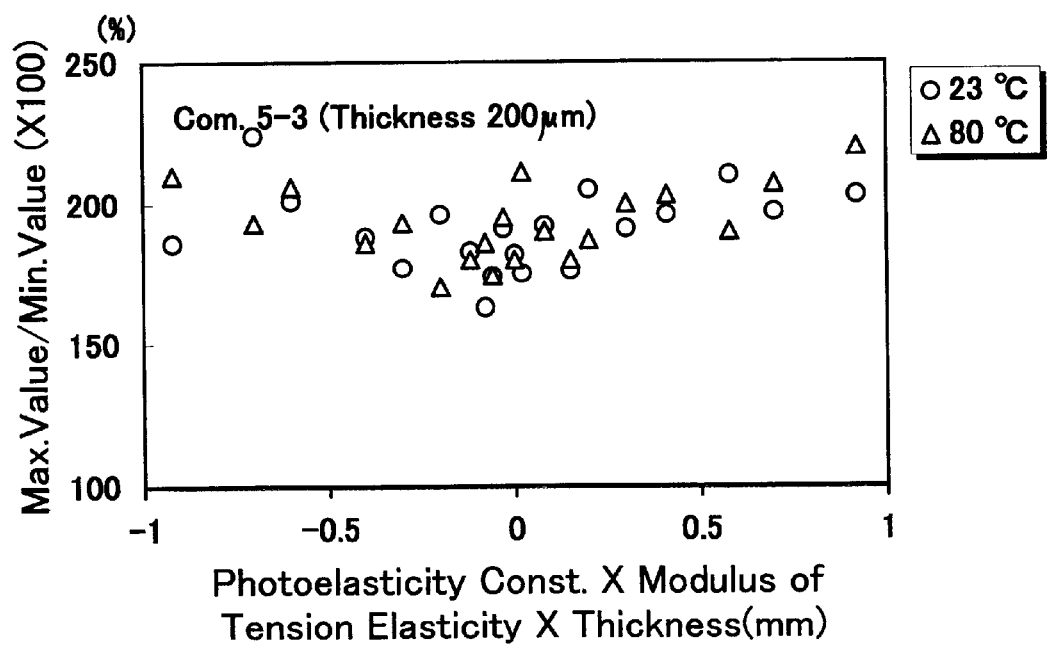

FIG. 13(a) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 120 $\mu$m in a comparative example 5-1 of the present invention.

FIG. 13(b) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 150 $\mu$m in a comparative example 5-2 of the present invention.

FIG. 13(c) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 200 $\mu$m in a comparative example 5-3 of the present invention.

As seen from FIGS. 13(a) to 13(c), in the comparative examples 5-1 to 5-3, the respective ratio of the maximum value to the minimum value with respect to the reproducing signal amplitude is degraded compared with those of the embodiments 7 irrespective of the product value of a product value of a photoelasticity constant, a modulus of tension elasticity and a thickness (mm) with respect to the resin film 6. In other words, the thickness of the adhesive layer 8 has to be made to be not more than 100 $\mu$m.

[Embodiment 8]

An optical disc having a recording layer (not shown) of an embodiment 8 was formed in the approximately same manner as mentioned in the embodiment 1.

Specifically, referring to FIG. 1, a polycarbonate substrate 2 having a diameter of 120 mm and a thickness of 0.9 mm was formed to have guide grooves (not shown) by the injection molding method. On the guide grooves there was formed a reflecting layer 3 of Au having a thickness of 600 Å by spattering method. Further on the reflecting layer 3 a recording layer (not shown) of a metal complex dye shown in a chemical equation (1) by spin-coat method.

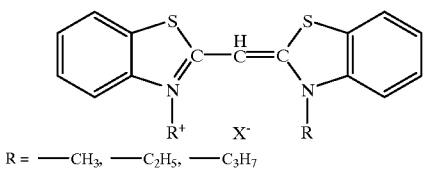

(1)

R = ——CH₃, ——C₂H₅, ——C₃H₇

Then, a write once type optical disc was obtained by bonding a resin film 6 in the same manner as mentioned in the embodiment 1.

The various kinds of write once type optical discs were produced by using different kinds of the resin films 6 obtained by changing values of the photoelasticity constant, the modulus of tension elasticity and the thickness thereof. On each of to these optical discs, recording signals of EFM were recorded with a laser pickup having the NA of 0.8 by irradiating a reproducing light having a wavelength of 413 nm, and the recorded signals were reproduced with the laser pickup. The measurement of the reproducing characteristics of these optical discs 10 was performed about a variation of a reproducing signal amplitude in one rotation of each disc.

Figure 14:
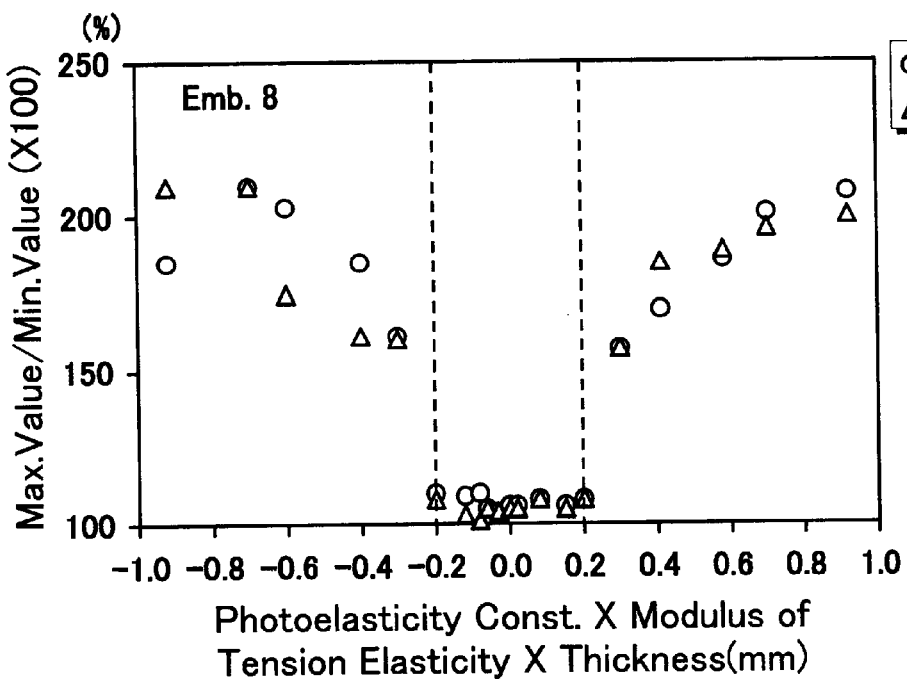
FIG. 14 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of the optical disc with the adhesive layer having a thickness of 5 μm in an embodiment 8 of the present invention.

FIG. 14 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of the optical disc with the adhesive layer having a thickness of 5 μm in an embodiment 8 of the present invention.

As seen from FIG. 14, an excellent signal characteristic is obtained in the respective optical discs of the embodiments 18 by establishing the product value of the photoelasticity constant, the modulus of tension elasticity and the thickness of the adhesive layer 8 within −0.2 to 0.2 mm.

Comparative Examples 6-1, 6-2 and 6-3

In comparative examples 6-1 to 6-3, the thickness of the adhesive layer 8 is made to be 120 μm, 150 μm and 200 μm, respectively. Other manufacturing conditions and the measuring conditions are the same as those of the embodiment 8. Thus, the detailed description is omitted here for simplicity.

Figure 15:
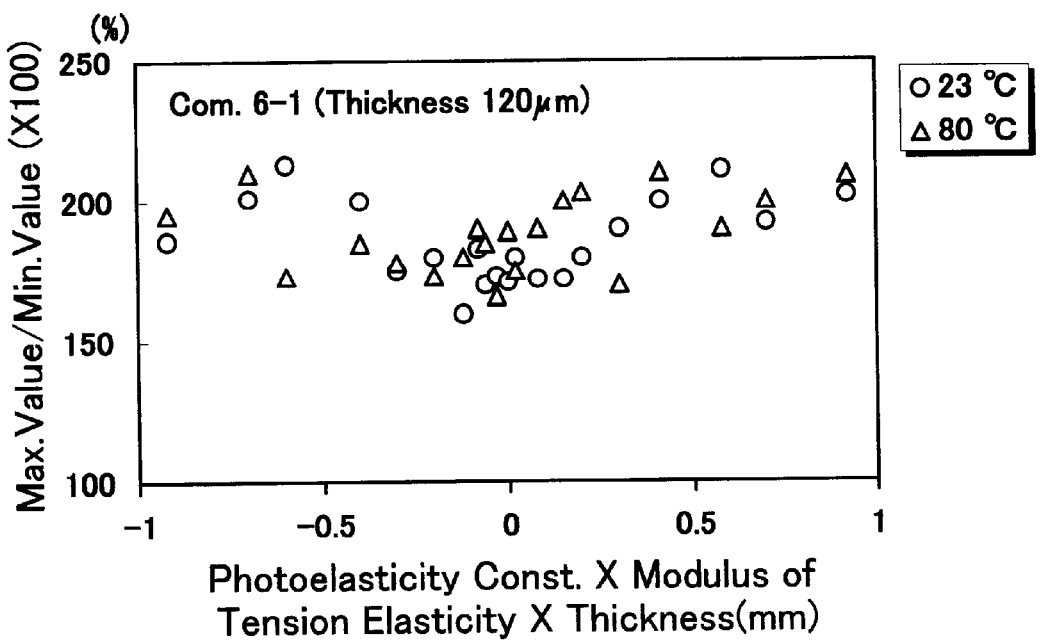
FIG. 15($a$) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 120 μm in a comparative example 6-1 of the present invention.
Figure 15:
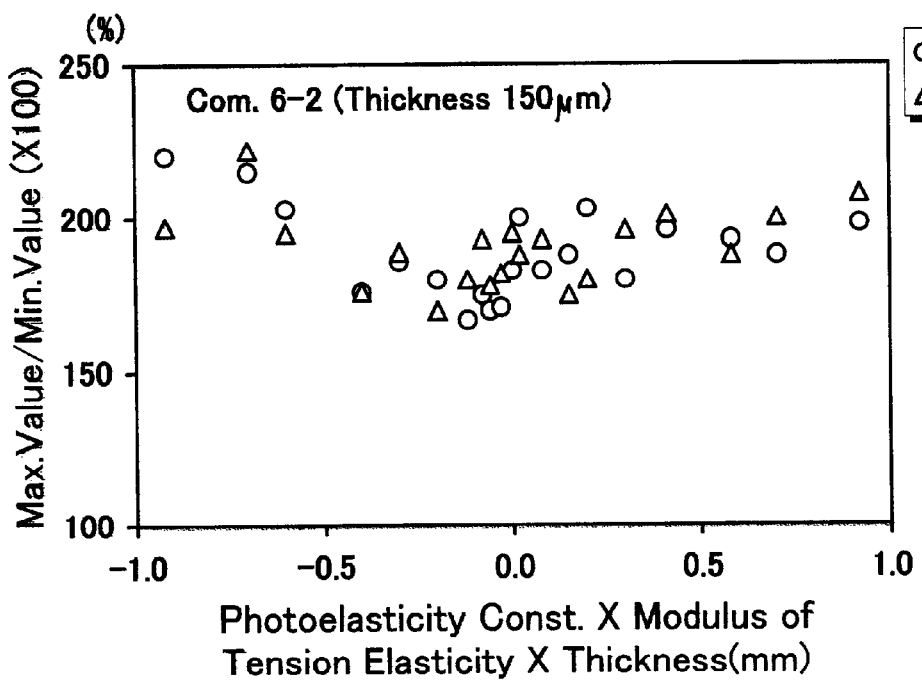
Figure 15:
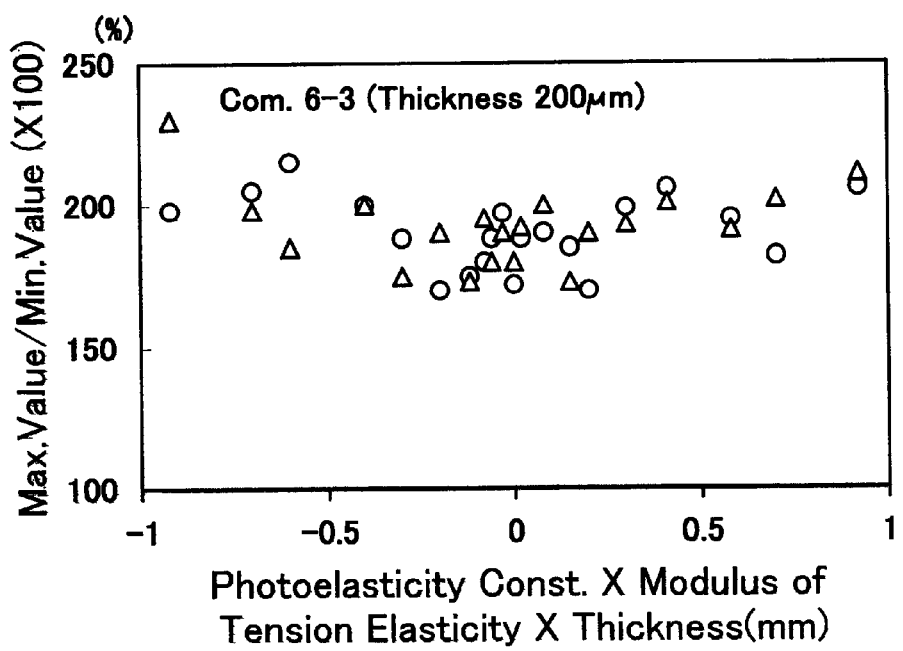

FIG. 15(*a*) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 120 μm in a comparative example 6-1 of the present invention.

FIG. 15(*b*) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 150 μm in a comparative example 6-2 of the present invention.

FIG. 15(*c*) is a graph for explaining a relation between a product value of a photoelasticity constant, a modulus of tension elasticity and a thickness (mm) with respect to a resin film, and the ratio (×100) of a maximum value to a minimum value with respect to the reproducing signal amplitude during one rotation of an optical disc with the adhesive layer of 200 μm in a comparative example 6-3 of the present invention.

As seen from FIGS. 15(*a*) to 15(*c*), in the comparative examples 6-1 to 6-3, the respective ratio of the maximum value to the minimum value with respect to the reproducing signal amplitude is increased compared with that of the embodiment 8 irrespective of the product value of a product value of a photoelasticity constant, a modulus of tension elasticity and a thickness (mm) with respect to a resin film 6. In other words, the thickness of the adhesive layer 8 has to be made to be not more than 100 μm.

[Embodiment 9]

An optical disc having a recording layer (not shown) in an embodiment 8 was formed in the approximately same manner as mentioned in the embodiment 1.

Specifically, referring to FIG. 1, a polycarbonate substrate 2 having a diameter of 120 mm and a thickness of 0.9 mm was formed to have guide grooves (not shown) having a track pitch of 0.36 μm by the injection molding method. On the guide grooves there was formed a reflecting layer 3 of Al—Ti having a thickness of 150 Å by the spattering method. Further on the reflecting layer 3 a second dielectric layer (ZnS—SiO₂) (not shown), a phase change recording layer (composition: Ag0.05-In0.05-Te-0.30-Sb0.60) (not shown) and a first dielectric layer (ZnS—SiO₂) (not shown) are successively formed in this order by the spattering method or the spin-coat method.

Then, a writable optical disc (not shown) was obtained by attaching the resin film 6 in the same manner as mentioned in the embodiment 1.

The various kinds of write once type optical discs were produced by using different kinds of the resin film 6 obtained by changing values of the photoelasticity constant, the modulus of tension elasticity and the thickness of the resin film 6. On each of to these optical discs, recording signals of EFM were recorded with a laser pickup having the NA of 0.8 by irradiating a reproducing light having a wavelength of 413 nm, and the recorded signals were reproduced with the laser pickup. The measurement of the reproducing characteristics of these optical discs was performed about the variation of reproducing signal amplitude during one rotation of each disc.

Figure 16:
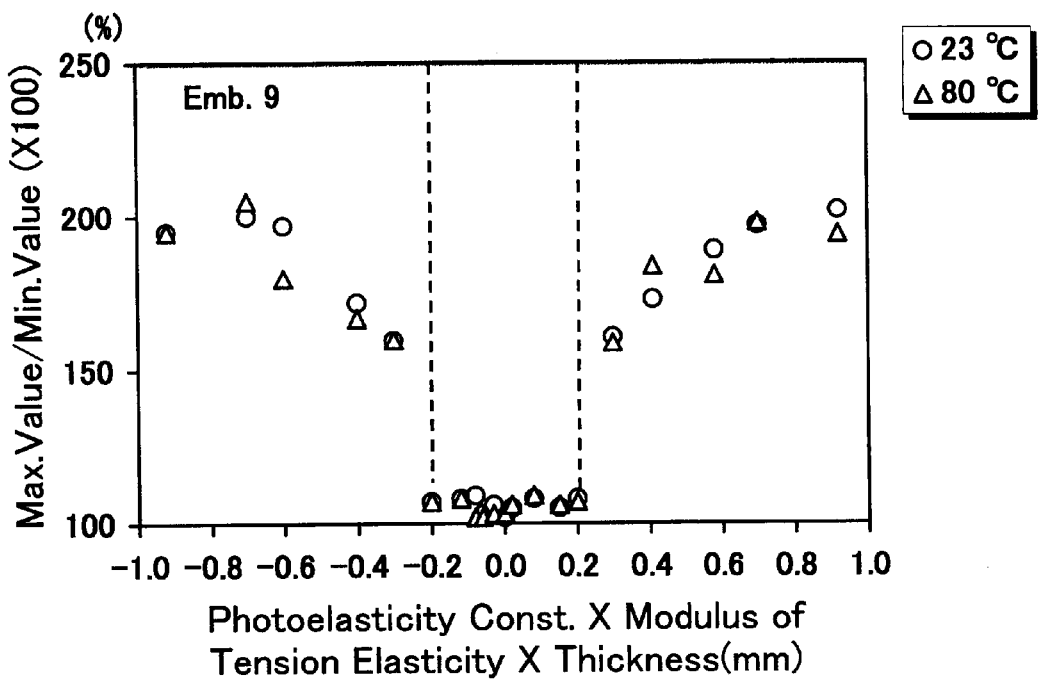
FIG. 16 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of the optical disc with the adhesive layer having the thickness of 5 μm in an embodiment 9 of the present invention.

FIG. 16 is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of the optical disc with the adhesive layer having the thickness of 5 μm in an embodiment 9 of the present invention.

As seen from FIG. 16, an excellent signal characteristic is obtained in the respective optical discs of the embodiment 9 by establishing the product value of the photoelasticity constant, the modulus of tension elasticity and the thickness of the adhesive layer 8 within −0.2 to 0.2 mm.

Comparative Examples 7-1, 7-2 and 7-3

In comparative examples 7-1 to 7-3, the thickness of the adhesive layer 8 is made to be 120 μm, 150 μm and 200 μm, respectively. Other manufacturing conditions and the measuring conditions are the same as those of the embodiment 9. Thus, the detailed description is omitted here for simplicity.

Figure 17:
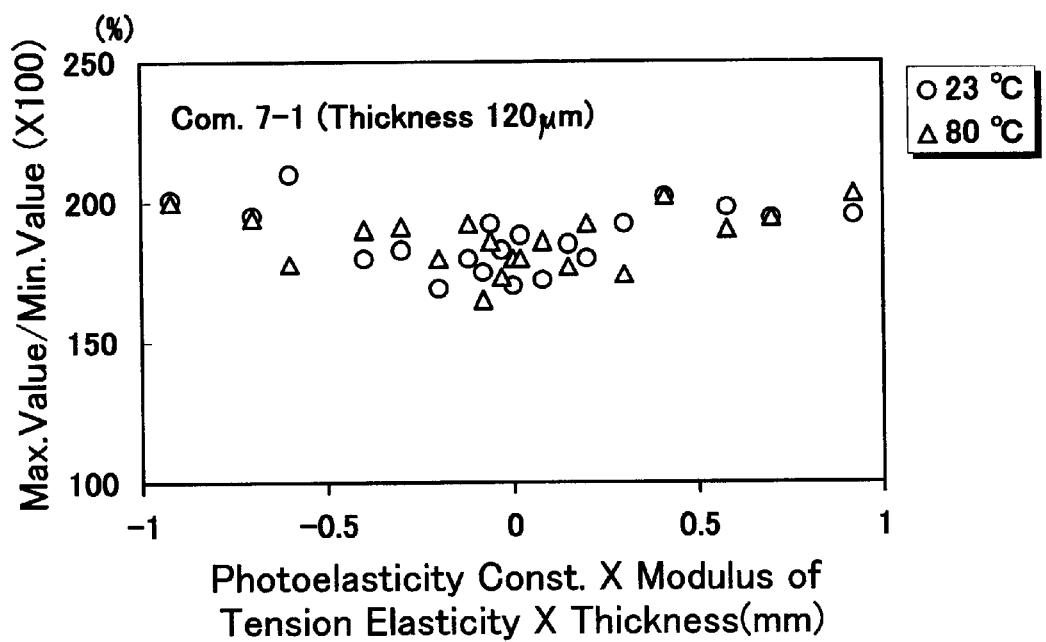
FIG. 17($a$) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 120 μm in a comparative example 7-1 of the present invention.
Figure 17:
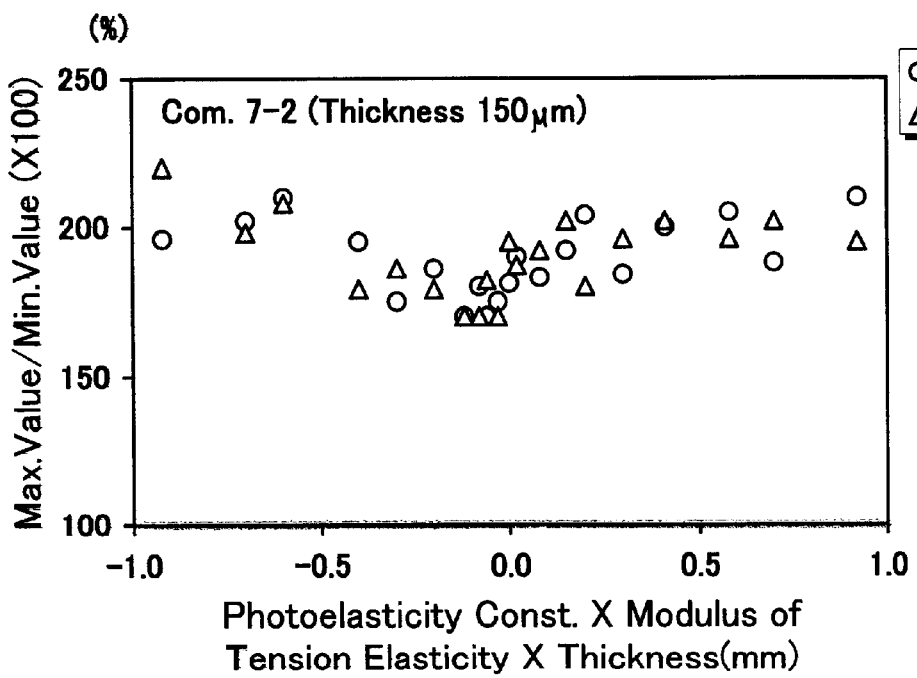
Figure 17:
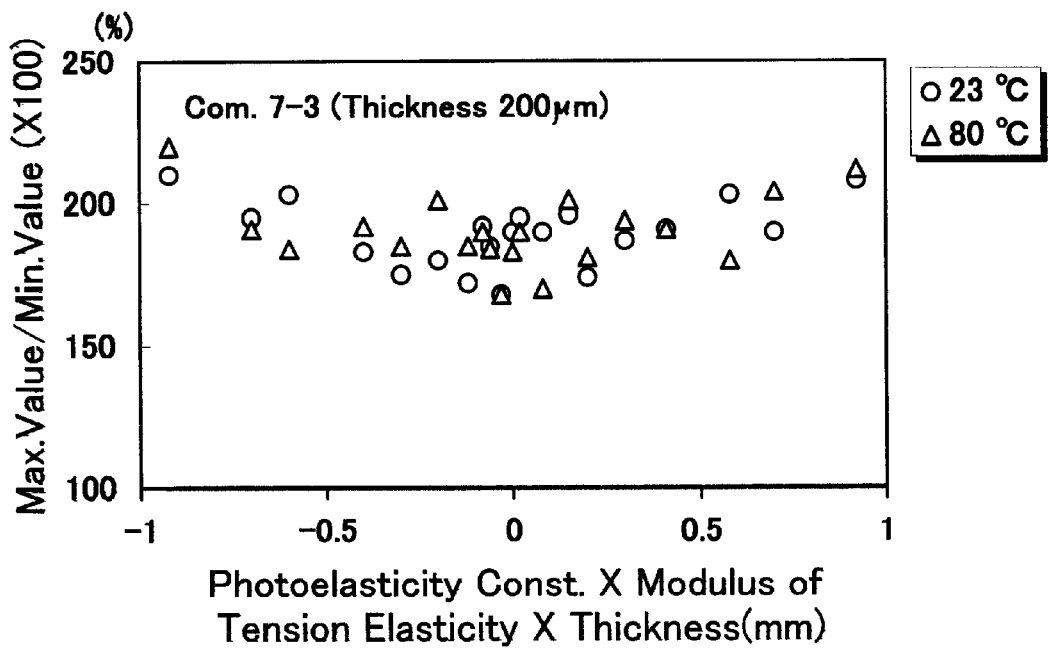

FIG. 17(*a*) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 120 μm in a comparative example 7-1 of the present invention.

FIG. 17(b) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 150 μm in a comparative example 7-2 of the present invention.

FIG. 17(c) is a graph for explaining a relation between a product value of a photoelasticity constant, a modulus of tension elasticity and a thickness (mm) with respect to a resin film, and the ratio (×100) of the maximum value to the minimum value with respect to the reproducing signal amplitude during one rotation of an optical disc with the adhesive layer having the thickness of 200 μm in a comparative example 7-3 of the present invention.

As seen from FIGS. 17(a) to 17(c), in the comparative examples 7-1 to 7-3, the respective ratio of the maximum value to the minimum value with respect to the reproducing signal amplitude is degraded compared with those of the embodiment 9 irrespective of the product value of a photoelasticity constant, a modulus of tension elasticity and a thickness (mm) with respect to a resin film 6. In other words, the thickness of the adhesive layer 8 has to be made not more than 100 μm.

In the embodiments of the present invention, as the adhesive, there is employed an ultraviolet ray curing resin, however, it is not limited to it. For instance, 2 liquid type epoxy adhesive, anaerobic type adhesive, primer curing type adhesive, cyanoacrylate type adhesive or a double sticker having adhesives on both surfaces on a plastic sheet is available. In other words, any type adhesive is available as long as it can be used as the light transmission layer.

According to the optical disc of the present invention, the thickness of the adhesive layer 8 formed between the resin film 6 and the reflecting layer 3 is made to be not more than 100 μm, and the product value of the photoelasticity constant, the modulus of tension elasticity and the thickness of with respect to the resin film 6 is established within −0.2 to 0.2 mm, resulting in an optical disc having high reproducing signal characteristics even under such a severe circumstance as a humid and hot temperature. Thereby, it is possible to provide the optical disc having high quality and liability.

What is claimed is:

1. An optical disc used for an optical information recording comprising:
   a substrate having a group of pits/grooves representing information signal on a surface thereof;
   a reflecting layer formed on the substrate; and
   a resin film formed on the reflecting layer through an adhesive layer,
   wherein a thickness of the adhesive layer being not more than 100 μm and a product value of a photoelasticity constant, a modulus of tension elasticity and a thickness with respect to the resin film being established within −0.2 to 0.2 mm.

2. An optical disc used for an optical information recording comprising:
   a substrate having a group of pits/grooves representing information signal on a surface thereof;
   a reflecting layer formed on the substrate;
   a recording layer formed on the reflecting layer; and
   a resin film formed on the reflecting layer through an adhesive layer,
   wherein a thickness of the adhesive layer being not more than 100 μm, and a product value of a photoelasticity constant, a modulus of tension elasticity and a thickness with respect to the resin film being established within −0.2 to 0.2 mm.

3. The optical disc as claimed in claim 2, wherein the recording layer being made of coloring matter.

4. An optical disc used for an optical information recording comprising:
   a substrate having a group of pits/grooves representing information signal on a surface thereof;
   a reflecting layer formed on the substrate;
   a first dielectric layer formed on the reflecting layer;
   a recording layer formed on the reflecting layer;
   a second dielectric layer formed on the recording layer; and
   a resin film formed on the reflecting layer through an adhesive layer,
   wherein a thickness of the adhesive layer being not more than 100 μm and a product value of a photoelasticity constant, a modulus of tension elasticity and a thickness with respect to the resin film being established within −0.2 to 0.2 mm.

* * * * *